(12) United States Patent
Chen et al.

(10) Patent No.: US 7,723,728 B2
(45) Date of Patent: May 25, 2010

(54) FAN-OUT WIRE STRUCTURE FOR A DISPLAY PANEL

(75) Inventors: Kun-Hong Chen, Danshuei Township, Taipei County (TW); Wen-Rei Guo, Jhunan Township, Miaoli County (TW)

(73) Assignee: Au Optronics Corporation, Hsinchu (TW)

( * ) Notice: Subject to any disclaimer, the term of this patent is extended or adjusted under 35 U.S.C. 154(b) by 911 days.

(21) Appl. No.: 11/438,382

(22) Filed: May 22, 2006

(65) Prior Publication Data
US 2007/0039706 A1    Feb. 22, 2007

(30) Foreign Application Priority Data
Aug. 19, 2005    (TW) ............................... 94128484 A

(51) Int. Cl.
*H01L 27/12* (2006.01)
(52) U.S. Cl. .................. 257/72; 257/E23.062; 257/29; 257/751; 349/151; 349/152; 345/98
(58) Field of Classification Search .......... 257/E23.062, 257/E23.07, E23.178, 72, 207, 751, E21.413, 257/29, 258; 162/301; 29/603.18, 603.25, 29/831, 847; 349/152, 151, 147–149; 345/90, 345/98–100; 174/254, 260; 438/30, 149
See application file for complete search history.

(56) References Cited

U.S. PATENT DOCUMENTS

| | | | |
|---|---|---|---|
| 5,346,748 A * | 9/1994 | Yokono | 428/209 |
| 5,892,558 A | 4/1999 | Ge et al. | |
| 6,710,459 B2 * | 3/2004 | Hsu | 257/778 |
| RE38,516 E | 5/2004 | Hasegawa et al. | 349/58 |
| 6,730,932 B2 | 5/2004 | Yamazaki et al. | 257/72 |
| 6,737,799 B1 | 5/2004 | Lih et al. | |
| 6,831,724 B2 * | 12/2004 | Ohta et al. | 349/141 |
| 6,835,896 B2 * | 12/2004 | Hwang et al. | 174/255 |
| 6,872,580 B2 * | 3/2005 | Chen et al. | 438/4 |
| 6,956,757 B2 * | 10/2005 | Shepard | 365/100 |
| 7,005,852 B2 * | 2/2006 | Andrei et al. | 324/252 |

(Continued)

FOREIGN PATENT DOCUMENTS

CN    1499473    5/2004

(Continued)

OTHER PUBLICATIONS

English language translation of abstract of TW 571288.

(Continued)

*Primary Examiner*—Chris C Chu
(74) *Attorney, Agent, or Firm*—Thomas, Kayden, Horstemeyer & Risley

(57) ABSTRACT

A fan-out wire structure is used to connect a driver and a display region of a display panel and has a plurality of first single-layer wires and at least one second single-layer wire. The first ends of the first single-layer wires are connected to the driver, and the second ends of the first single-layer wires are connected to the display area. The first end of the second single-layer wire is connected to the driver, and the second end of the second single-layer wire is connected to the display area. A metal layer of the first single-layer wires is different from a metal layer of the second single-layer wire.

7 Claims, 4 Drawing Sheets

U.S. PATENT DOCUMENTS

| | | | |
|---|---|---|---|
| 7,215,331 B2 | 5/2007 | Song et al. | |
| 7,333,172 B1 * | 2/2008 | Zhang | 349/153 |
| 7,454,724 B2 * | 11/2008 | Kurihara et al. | 716/5 |
| 7,459,779 B2 * | 12/2008 | Chung et al. | 257/692 |
| 7,459,780 B2 * | 12/2008 | Chen | 257/695 |
| 7,527,900 B2 * | 5/2009 | Zhou et al. | 430/5 |
| 2003/0128326 A1 * | 7/2003 | Yamaguchi et al. | 349/152 |
| 2003/0200647 A1 * | 10/2003 | Kamijima | 29/603.18 |
| 2005/0083742 A1 | 4/2005 | Hwang et al. | |

FOREIGN PATENT DOCUMENTS

| | | |
|---|---|---|
| TW | 460856 | 10/2001 |
| TW | 569477 | 1/2004 |
| TW | 571288 | 1/2004 |
| WO | WO 9900695 | 1/1999 |

OTHER PUBLICATIONS

English language translation of abstract of TW 569477.
English language translation of abstract of CN 1499473.
English language translation of abstract of WO 9900695.

* cited by examiner

FAN-OUT WIRE STRUCTURE FOR A DISPLAY PANEL

RELATED APPLICATIONS

The present application is based on, and claims priority from, Taiwan Application Serial Number 94128484, filed Aug. 19, 2005, the disclosure of which is hereby incorporated by reference herein in its entirety.

BACKGROUND

1. Field of Invention

The present invention relates to a display panel. More particularly, the present invention relates to a fan-out wire structure for the display panel.

2. Description of Related Art

Flat panel displays such as a liquid crystal display (LCD) and a plasma display have the advantages of high image quality, small size, light weight and a broad application range, and thus are widely applied on consumer electronic products such as a mobile phone, a notebook computer, a desktop display and a television, and have gradually replaced the conventional CRT displays as the main trend in the display industry. The requirements of the so-called big area and high resolution also become the key factors claimed by the flat panel displays.

FIG. 1 is a schematic diagram showing a conventional display panel. In a display panel 100, driver chips located on a data driver 104 and a scan driver 106 provide signals respectively to data lines and scan lines in a display area 102 via their own fan-out wire structures 108. Since the pin gaps of the driver chips are small and the gaps among the data lines or scan lines are large, the ends of the fan-out wire structures 108 close to the data driver 104 and the scan driver 106 has a smaller area and other ends of the fan-out wire structures 108 close to the display area 102 has a larger area, thus showing a fan-shaped area.

FIG. 2 is a schematic diagram showing the conventional fan-out wire structure. Generally speaking, different single-layer metal layers are used to form the wires 208 in accordance with different drivers 104 and 106 connected to the fan-out wire structures 108. For example, in the fan-out wire structure 108 connected to the data driver 104, the wires 208 thereof are formed from a second metal layer (M2) on the display panel; and in the fan-out wire structure 108 connected to the scan driver 106, the wires 208 thereof are formed from a first metal layer (M1) on the display panel.

However, with the increasing resolution of the flat panel display and the decreasing size of the display frame, the gaps among the wires 208 are also reduced and have approached to the limits allowed by the design rule. Moreover, for preventing signal quality from being affected by different lengths of transmission paths, the wires 208 in the fan-out wire structure 108 sometimes may need extra curves to provide the transmission paths of equal impedance, and yet, this method takes more space. Hence, the aforementioned conventional skill using one single-layer metal layer to construct all of the wires in the same fan-out wire structure 108 cannot satisfy the current requirements, and cannot be used for fabricating flat panel displays having higher resolution, lighter weight and thinner size, and better display quality.

SUMMARY

Hence, one aspect of the present invention is to provide a fan-out wire structure for a display panel, thereby fabricating a flat panel display with higher resolution, lighter weight and thinner size, and better display quality.

In accordance with a preferred embodiment, the fan-out wire structure comprises a plurality of wires. Each of the wires is formed from a single-layer metal layer, wherein the single-layer metal layer of at least one wire is different from the single-layer metal layer of the other wires.

In accordance with another preferred embodiment, the fan-out wire structure is located on a glass substrate of a display panel, and the fan-out wire structure comprises a plurality of wires. The wires are formed respectively from a first metal layer and a second metal layer formed on a glass substrate, wherein at least one of the wires is of the first metal layer, and at least one of the other wires is of the second metal layer, and each of the wires is not across both of the first metal layer and the second metal layer.

In accordance with still another preferred embodiment, the fan-out wire structure is used for connecting a driver to a display area in a display panel, and the fan-out wire structure comprises a plurality of first single-layer wires and at least one second single-layer wire. One end of each of the first single-layer wires is connected to the driver, and the other end of each of the first single-layer wires is connected to the display area. One end of the second single-layer wire is connected to the driver, and the other end of the second single-layer wire is connected to the display area, wherein the metal layer of the first single-layer wires is different from the metal layer of the second single-layer wire.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
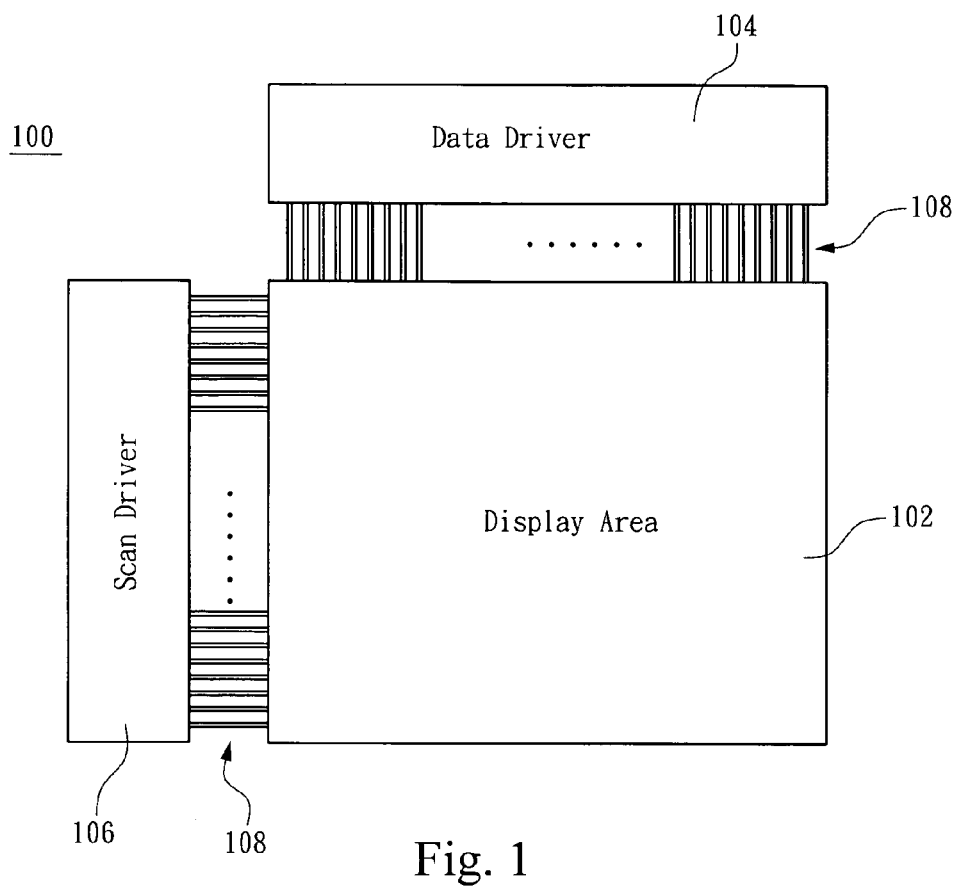
FIG. 1 is a schematic diagram showing a conventional display panel.
Figure 2:
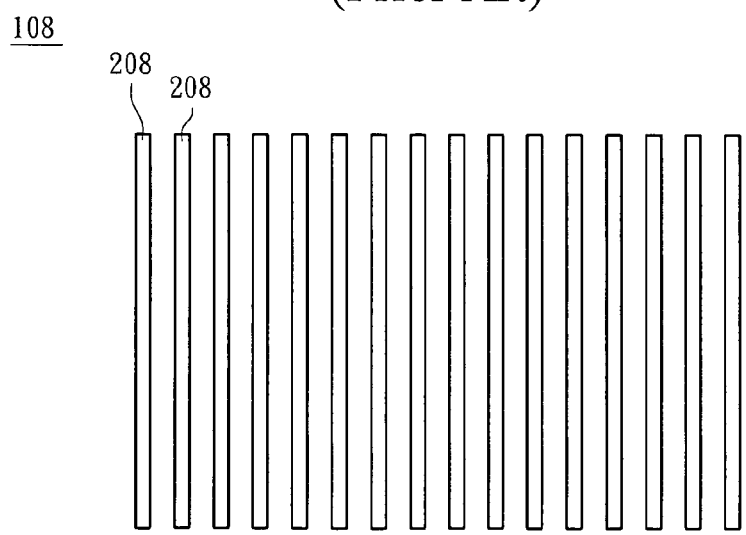
FIG. 2 is a schematic diagram showing the conventional fan-out wire structure.

Reference will now be made in detail to the preferred embodiments of the present invention, examples of which are illustrated in the accompanying drawings. Wherever possible, the same reference numbers are used in the drawings and the description to refer to the same or like parts.

The present invention is featured in forming individual wires by using different single-layer metal layers, thereby promoting the wire distribution density in the fan-out wire structure via a plurality of metal layers and the wires each of which are not across different metal layers, thus fabricating a flat panel display with higher resolution, lighter weight and smaller size and better display quality.

Figure 3:
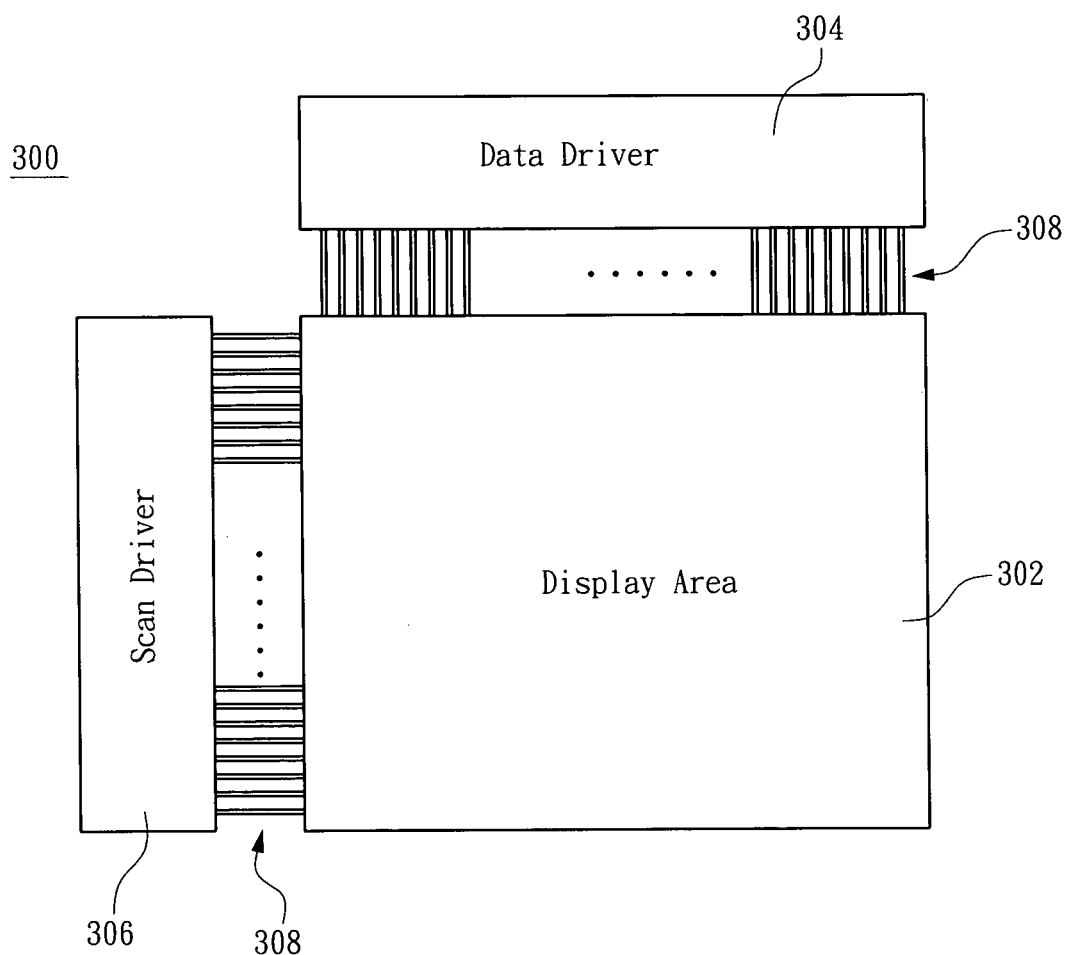
FIG. 3 is a schematic diagram showing a display panel according to a preferred embodiment of the present invention.

FIG. 3 is a schematic diagram showing a display panel according to a preferred embodiment of the present invention, wherein a display panel 300 comprises a display area 302, a data driver 304 and a scan driver 306. The display panel 300 can be used in such as a liquid crystal display, a plasma display, an organic electroluminescent display, an optical interference display or other suitable flat panel displays.

The driver chips disposed in the data driver 304 and the scan driver 306 provide signals respectively to data lines and scan lines in the display area 302 via their own fan-out wire structures 308. Since the pin gaps of the driver chips are small and the gaps among the data lines or scan lines are large, the ends of the fan-out wire structures 308 close to the data driver 304 and the scan driver 306 has a smaller area and other ends of the fan-out wire structures 308 close to the display area 302 has a larger area, thus showing a fan-shaped area.

Figure 4A:
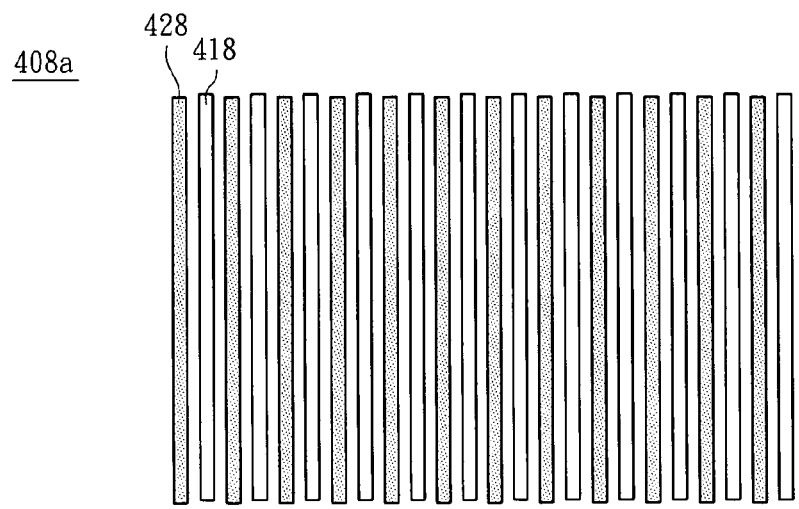
FIG. 4A is a schematic diagram showing a fan-out wire structure according to a preferred embodiment of the present invention.

FIG. 4A is a schematic diagram showing a fan-out wire structure according to a preferred embodiment of the present invention, wherein a fan-out wire structure 408a comprises a plurality of wires 418 and a plurality of wires 428. Each of the wires 418 is formed form a first metal layer M1 alone, and each of the wires 428 is formed form a second metal layer M2 alone, i.e. each of the wires 418 or 428 is formed from a single-layer metal layer M1 or M2, and the metal layer of at least one wire is different from the metal layer of the other wires.

In one aspect, the fan-out wire structure 408a is located on a glass substrate of a display panel, and comprises a plurality of wires 418 and 428. The wires 418 and 428 are formed respectively from a first metal layer M1 and a second metal layer M2, wherein at least one wire (418) is of the first metal layer M1, and at least another wire (428) is of the second metal layer M2. Each of the wires 418 or 428 is not across the metal layers, i.e. each individual wire has to be formed from one single-layer metal layer M1 or Me alone.

In the other aspect, referring to FIG. 3 and FIG. 4A, the fan-out wire structure 408a is used for connecting the display area 302 to the driver 304 or 306, and comprises a plurality of single-layer wires 418 and at least one single-layer wire 428. One end of each first single-layer wire 418 is connected to the driver 304 or 306, and the other end of each first single-layer wire 418 is connected to the display area 302. One end of the second single-layer wire 428 is connected to the driver 304 or 306, and the other end of the second single-layer wire 428 is connected to the display area 302.

The first metal layer M1 of the first single-layer wires 428 is different from the second metal layer M2 of the second single-layer wire 418. Moreover, the single-layer wires 418 and 428 are connected to a plurality of pins of the driver 304 or 306 in a one-to-one relationship, i.e. to the pins of a driver chip.

Figure 4B:
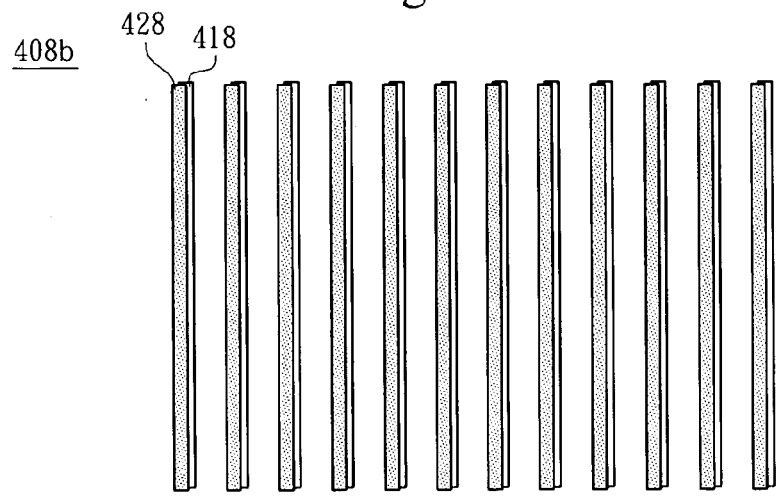
FIG. 4B is a schematic diagram showing a still another fan-out wire structure according to a preferred embodiment of the present invention.
Figure 4C:
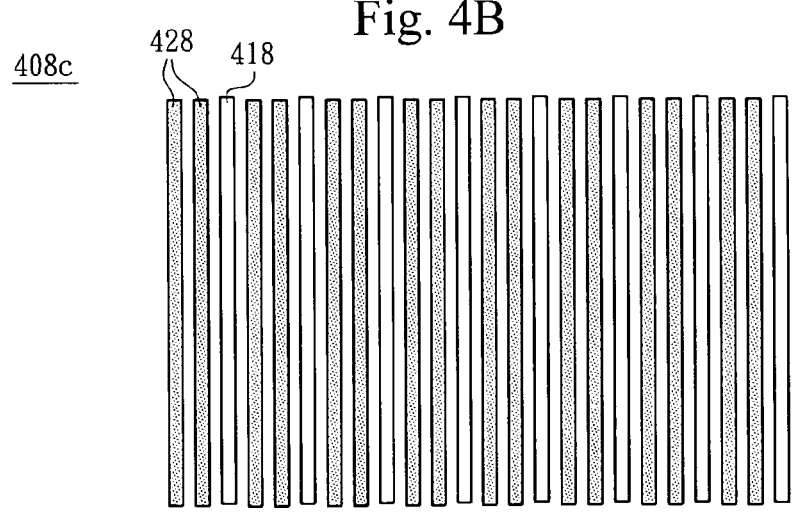
FIG. 4C is a schematic diagram showing a further another fan-out wire structure according to a preferred embodiment of the present invention.

FIG. 4B is a schematic diagram showing a still another fan-out wire structure according to a preferred embodiment of the present invention; and FIG. 4C is a schematic diagram showing a further another fan-out wire structure according to a preferred embodiment of the present invention. FIG. 4A to FIG. 4C are referenced for explaining the relationships between different single-layer wires and different single-layer metal layers thereof.

In accordance with the preferred embodiments of the present invention, the wires 418 and 428 are arranged in a predetermined sequence in the fan-out wire structure 408a according to the respective single-layer metal layers of the wires 418 and 428. Further, two adjacent ones of the wires 418 and 428 are located on different metal layers, i.e. in case one of the two adjacent wires is located on the first metal layer M1, and the other one thereof is located on the second metal layer M2.

Such as shown in FIG. 4A, the wires 418 and 428 of different single-layer metal layers are alternately arranged, i.e. those next to both sides of the wires 418 located on the first metal layer M1 are the wires 428 located on the second metal layer M2. Or, such as shown in FIG. 4B, the wires 428 of the second metal layer M2 also can be formed directly above the wires 418 of the first metal layer M1.

Accordingly, the minimum gap between two wires 418 located on the first metal layer M1 can be as small as the limit allowed by the design rule, and the minimum gap between two wires 428 located on the second metal layer M2 also can be as small as the limit allowed by the design rule. By means of the arrangement in which two adjacent wires 418 and 428 are of different single-layer metal layers M1 and M2 respectively, the gap between two adjacent wires 418 and 428 can be as small as the limit allowed by the design rule, thereby increasing the number of wires accommodated in the fan-out wire structure and promoting the signal transmission quality.

A proper arrangement method between the wires 418 and the wires 428 may be selected by those who are skilled in the art in accordance with the requirement of design and specification, and is not limited to the one-to-one arrangement method shown in FIG. 4A or FIG. 4B. Such as shown in FIG. 4C, one wire 428 located on the second metal layer M2 also can be arranged between two wires 418 and another two wires 418 of the first metal layer M1, so as to appropriately increasing the wire density in the fan-out wire structure.

Figure 5:
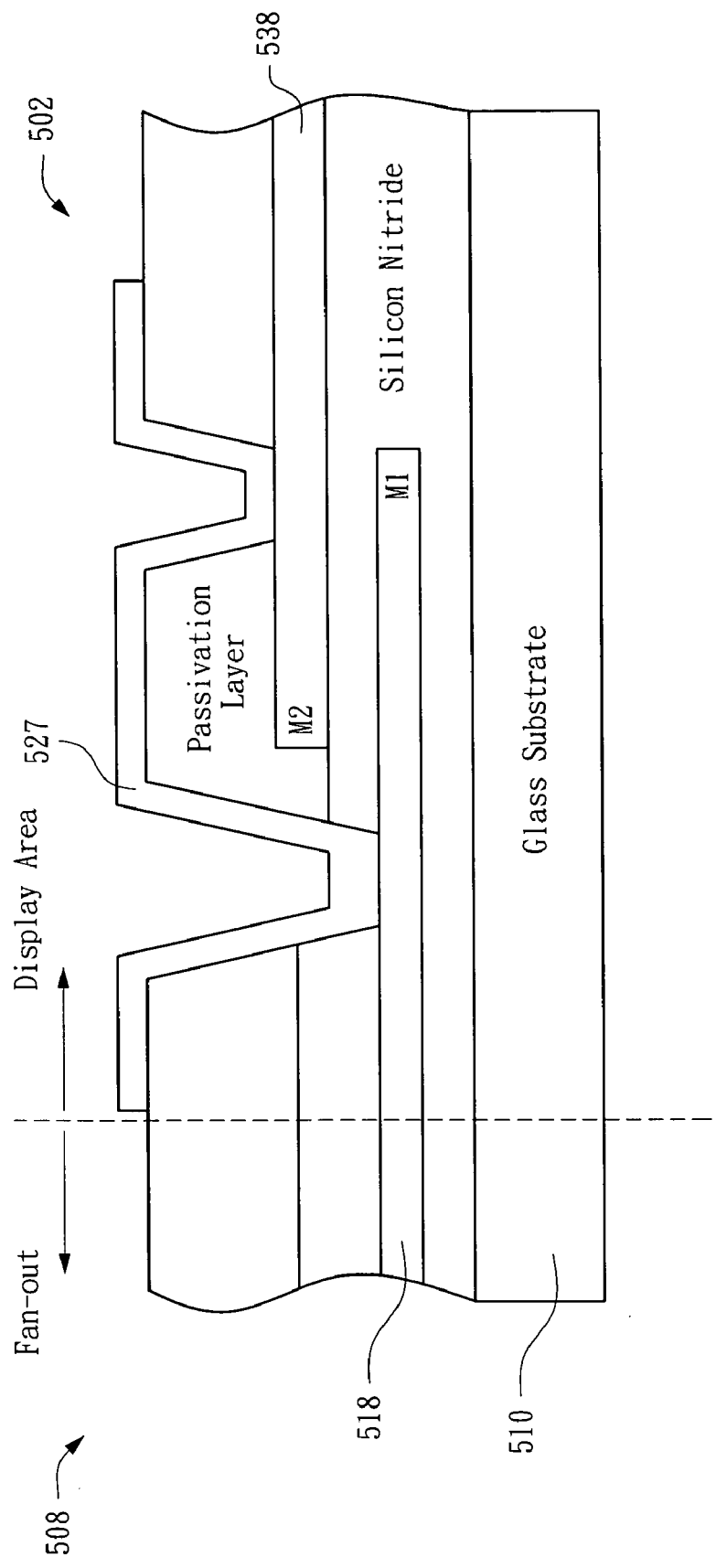
FIG. 5 illustrates a cross-sectional view showing a preferred embodiment of the present invention.

FIG. 5 illustrates a cross-sectional view showing a preferred embodiment of the present invention for explaining how to connect a wire 518 located on a first metal layer M1 in a fan-out wire structure 508 to a display element (not shown) located on a second metal layer M2 in a display area 502. Specifically speaking, while a connecting wire 538 of the display element in the display area 502 is located on the second metal layer M2 formed above a glass substrate 510, two through holes (not labeled) are first formed on the first metal layer M1 and the second metal M2, and then a wire 518 located on the first metal layer M1 in the fan-out wire structure 508 can be connected to the connecting wire 530 via a conductive layer 527 formed on the two through holes.

In other words, the single-layer wires described in the aforementioned preferred embodiments can be connected to circuit lines (such as data lines or scan lines) located on the meal layers different from where the single layer wires is, merely by using the through holes and conductive layer in the display area. Hence, in comparison to the conventional skill of using the wires all of which are formed from the second metal layer M2 to connect the data driver; and using the wires all of which are formed from the first metal layer M1 to connect the scan driver, the aforementioned preferred embodiment of the present invention can simultaneously use the fan-out wire structure containing wires of different single layers to connect the data driver or the scan driver.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fan-out wire structure disposed on a glass substrate of a display panel for connecting a driver to a display area in the display panel, comprising:

a plurality of wires respectively formed from a first metal layer and a second metal layer, wherein at least one of the wires is of the first metal layer, and at least one of the other wires is of the second metal layer, and each of the wires is not across both of the first metal layer and the second metal layer, wherein one end of each of the wires is connected to the driver, and the other end of each of the wires is connected to the display area, wherein two adjacent ones of the wires are separately formed from different metal layers.

2. The fan-out wire structure as claimed in claim 1, wherein the plurality of wires is repetitively arranged in the fan-out wire structure with a predetermined sequence according to the metal layer of each of the wires.

3. A fan-out wire structure used for connecting a driver to a display area in a display panel, comprising:

a plurality of first single-layer wires, wherein one end of each of the first single-layer wires is connected to the driver, and the other end of each of the first single-layer wires is connected to the display area; and at least one second single-layer wire, wherein one end of the second single-layer wire is connected to the driver, and the other end of the second single-layer wire is connected to the display area, and a metal layer of the first single-layer wires is different from a metal layer of the second single-layer wire.

4. The fan-out wire structure as claimed in claim 3, wherein the single-layer wires are connected to a plurality of pins of the driver in a one-to-one relationship.

5. The fan-out wire structure as claimed in claim 3, wherein the single-layer wires are repetitively arranged in the fan-out wire structure with a predetermined sequence according to the metal layer of each of the single-layer wires.

6. The fan-out wire structure as claimed in claim 3, wherein two adjacent ones of the single-layer wires are separately formed from different metal layers.

7. The fan-out wire structure as claimed in claim 3, wherein the single-layer wires are disposed on a glass substrate of the display panel.

* * * * *